United States Patent
Chew

(10) Patent No.: US 8,631,255 B2
(45) Date of Patent: Jan. 14, 2014

(54) METHOD, SYSTEM AND APPARATUS FOR DYNAMIC BUFFER MANAGEMENT FOR POWER SAVING

(75) Inventor: Yen Hsiang Chew, Penang (MY)

(73) Assignee: Intel Corporation, Santa Clara, CA (US)

(*) Notice: Subject to any disclaimer, the term of this patent is extended or adjusted under 35 U.S.C. 154(b) by 404 days.

(21) Appl. No.: 12/910,338

(22) Filed: Oct. 22, 2010

(65) Prior Publication Data

US 2012/0005512 A1 Jan. 5, 2012

(30) Foreign Application Priority Data

Jul. 2, 2010 (MY) .......................... PI 2010003172

(51) Int. Cl.
*G06F 1/00* (2006.01)
(52) U.S. Cl.
USPC ............................ 713/300; 713/320; 713/324
(58) Field of Classification Search
USPC .......................................... 713/300, 320, 324
See application file for complete search history.

(56) References Cited

U.S. PATENT DOCUMENTS

| | | | |
|---|---|---|---|
| 6,708,278 B2 * | 3/2004 | Howard et al. | 713/323 |
| 7,069,373 B2 * | 6/2006 | Teng | 710/310 |
| 7,167,934 B1 * | 1/2007 | Dunn et al. | 710/52 |
| 7,210,619 B2 * | 5/2007 | Wurzburg | 235/375 |
| 7,606,951 B2 * | 10/2009 | Woodbridge | 710/36 |
| 7,774,521 B2 * | 8/2010 | Gupta et al. | 710/54 |
| 7,840,733 B2 * | 11/2010 | Por et al. | 710/104 |
| 7,991,921 B2 * | 8/2011 | Fischer | 710/8 |
| 8,001,296 B2 * | 8/2011 | Saito | 710/56 |
| 8,078,893 B2 * | 12/2011 | Umedu | 713/320 |
| 8,200,853 B2 * | 6/2012 | Aull et al. | 710/8 |
| 8,234,421 B2 * | 7/2012 | Leaming | 710/52 |
| 8,281,171 B2 * | 10/2012 | Tang | 713/323 |
| 2006/0035527 A1 * | 2/2006 | Numano | 439/668 |
| 2008/0005445 A1 * | 1/2008 | Diefenbaugh et al. | 710/313 |
| 2010/0005204 A1 * | 1/2010 | Por et al. | 710/104 |
| 2010/0005327 A1 * | 1/2010 | Murata | 713/320 |
| 2010/0241889 A1 * | 9/2010 | Fu et al. | 713/324 |
| 2011/0099305 A1 * | 4/2011 | Dai et al. | 710/52 |
| 2011/0231682 A1 * | 9/2011 | Kakish et al. | 713/320 |

* cited by examiner

*Primary Examiner* — Brian Misiura
(74) *Attorney, Agent, or Firm* — Kacvinsky Daisak PLLC

(57) ABSTRACT

A method and apparatus may detect an event related to an external device communicating with a host controller. One or more external device characteristics of the external device may be determined. One or more physical memory cells for the host controller may be modified based on the one or more external device characteristics.

17 Claims, 6 Drawing Sheets

METHOD, SYSTEM AND APPARATUS FOR DYNAMIC BUFFER MANAGEMENT FOR POWER SAVING

BACKGROUND

Computing devices often contain input/out ports, such as USB ports. When an external device is plugged into the input/out port, the host controller of the hosting device is used to detect the speed of that external device. By determining the speed of the external device, the host controller can arrange the hosting device to function at the speed needed by the external device. Often a host controller supports multiple external devices from input/output ports. Each external device plugged into the input/output port consumes power from the hosting device. As a result, the power consumption of a hosting device with external devices attached is not optimized as the external device requests and receives a certain amount of power.

DETAILED DESCRIPTION

The embodiments are generally directed to techniques for minimizing power consumption. In an embodiment, an event may be detected related to an external device communicating with a host controller. Power to one or more physical memory cells for the host controller may be modified.

In an embodiment, for example, a hosting device may include a host controller with one or more input/output ports. Through the input/output (IIO) ports, a variety of external devices may be plugged into the hosting device. When an external device is plugged into an IIO port, an IIO port may detect the presence of an external device through various signaling methods and inform a host controller of the presence of an external device. The host controller may perform handshaking with the external device to determine the one or more external characteristics such as an operational speed and/or the number of communication lanes of the external device. The host controller may arrange the size of the host controller's internal buffers based on the speed and/or lane configurations of the external device. A sufficient buffer size may be determined to prevent buffer overflow. Additional unused buffers may be left idle and/or powered down by the host controller. The host controller's internal buffers may be in the form of a physical memory array. Each block of the physical memory may be power gated via power gating module. Each physical memory cell within a buffer may be dynamically turned on and/or off the by power gating module via instructions by the controller device driver. In this manner, the physical memory cells may be optimized to reduce power consumption and make the hosting device more power efficient. The hosting device may save overall power consumption. By reducing the power consumed in a hosting device with an external device, the battery of the hosting device may be prolonged. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
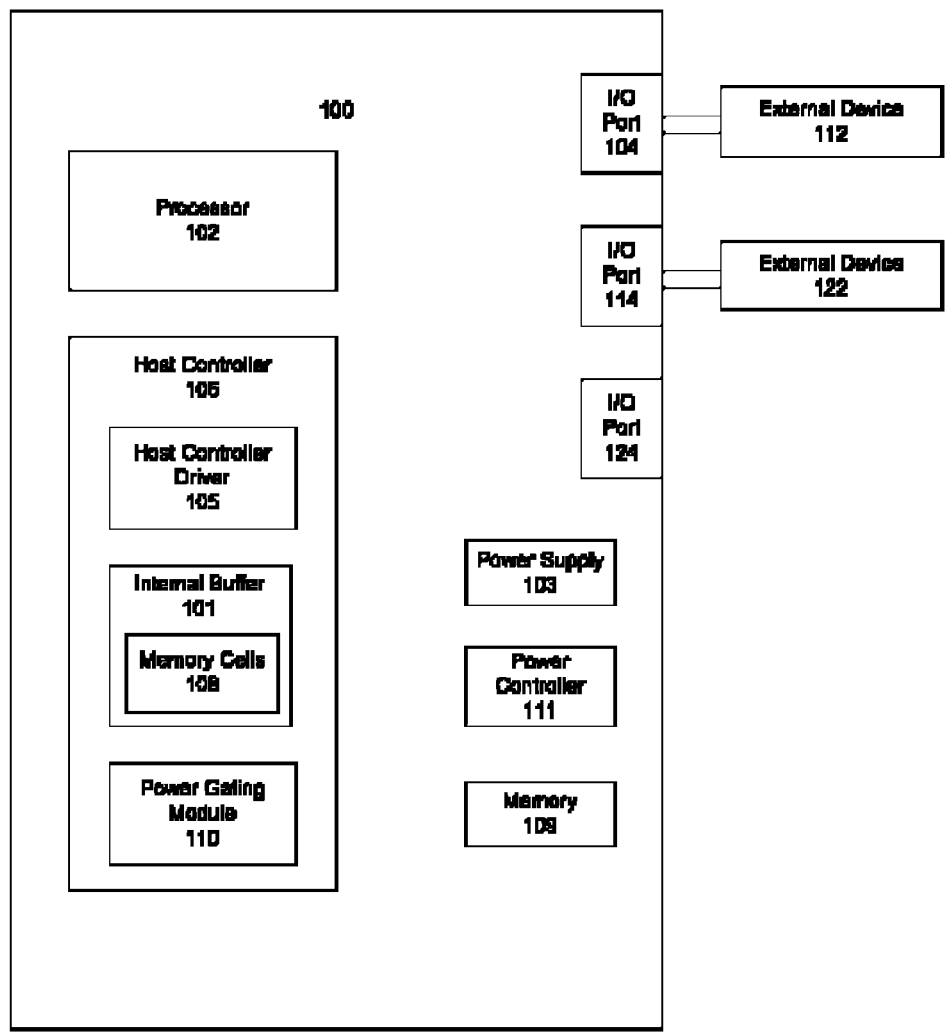
FIG. 1 illustrates an exemplary apparatus to reduce power consumption according to an embodiment.

FIG. 1 illustrates an exemplary apparatus to reduce power consumption according to an embodiment. FIG. 1 illustrates a block diagram of an apparatus 100. In an embodiment, the apparatus 100 may include a hosting device, a processing system, a computing device, a computer, a computer system, a computer sub-system, an appliance, a network application, a workstation, a terminal, a server, a personal computer (PC), a desktop computer, a laptop computer, an ultra-laptop computer, a notebook computer, a handheld computer, a personal digital assistant (PDA), a telephone, a mobile telephone, a cellular telephone, a handset, a smart phone, a pager, a one-way pager, a two-way pager, a digital camera, a digital video recorder, a digital video player, a digital audio recorder, a digital audio player, a set top box (STB), a media server, and so forth. The embodiments, however, are not limited to this example.

As shown in FIG. 1, the apparatus 100 may include multiple elements, such as a processor 102, one or more integrated input/output ports 104, 114 and 124, a host controller 106, a power supply 103, a power controller 111 and a memory 109. The host controller may include a host controller driver 105, an internal buffer 101 with memory cells 108 and a power gating module 110. An external device 112, 122 may be connected to the apparatus 100. The embodiments, however, are not limited to the elements shown in this figure. Although FIG. 1 is shown with a limited number of elements, it may be appreciated that the apparatus 100 may include more elements as desired for a given implementation.

In various embodiments, the apparatus 100 may include a processor 102. The processor 102 may comprise a general purpose processor or an application specific processor arranged to provide general or specific computing capabilities for the apparatus 100. While this embodiment is a single processor system, an alternate embodiment may include a dual or multiprocessor system. The embodiments, however, are not limited to this example. A processor 102 may be implemented using any processor or logic device, such as a central processing unit (CPU), a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 102 may be implemented as a general purpose processor, such as a processor made by Intel® Corporation, Santa Clara, Calif. Processor 102 may also be implemented as a dedicated processor, such as a controller, microcontroller, embedded processor, a digital signal processor (DSP), a network processor, a media processor, an input/output (110) processor, a media access control (MAC) processor, a radio baseband processor, a field programmable gate array (FPGA), a programmable logic device (PLD), and so forth. The embodiments are not limited in this context.

In an embodiment, the apparatus may include one or more input/output (IIO) ports 104, 114 and 124. An IIO port 104, 114 and 124 may include, but is not limited to, a United Serial Bus (USB), USB 2, USB 3, Peripheral Component Interconnect (PCI) Express 2 and/or Quick Path Interconnect (QPI). An IIO port 104, 114 and 124 may detect the attachment or detachment of an external device and inform host controller 106 of the attachment or detachment event. An IIO port 104 may allow an external device 112, 122 to communicate information, such as device state information, link configurations and other capabilities information, to elements within the apparatus 100. In an embodiment, an IIO port 104, 114 and 124 may detect the presence of an external device through various signaling methods, such as, but not limited to, electrical signaling, and inform a host controller 106 of the presence of an external device 112, 122.

In an embodiment, the apparatus 100 may include a host controller 106 coupled to a processor 102. The host controller 106 may provide for the exchange of information with various external devices through one or more IIO ports. In an embodiment, a host controller 106 may perform handshaking with an external device 112, 122 to determine the operational speed of the external device 112, 122 (for example, a USB device during a hot plug event) and/or the number of communication lanes of the external device 112, 122 (for example, a PCI Express device during link training). A host controller 106 may communicate with an IIO port 104 via direct media interface (DMI) or other suitable communication links between an IIO and a host controller. DMI may provide point-to-point communication between a processor and a host controller. A host controller 106 may include hardware internal to the apparatus 100 that provides high speed functionality to the IIO ports 104. In an embodiment, the host controller 106 may receive electrical signal from the external device 112, 122 via the IIO port 104. In an embodiment, a host controller 106 may detect an event related to an external device 112, 122 and may manipulate power to one or more physical memory cells 108 in response to detection of the event.

The host controller 106 may include a host controller driver 105. The host controller driver 105 may include firmware and/or software instructions that enable the host controller 106 to communicate with other components in apparatus 100. In an embodiment, the host controller driver 105 may enable the host controller 106 to manage one or more internal buffers 101 and one or more physical memory cells 108. The host controller 106 may communicate information with the external device 112, 122 and other elements within the apparatus 100 using a host controller driver 105. In an embodiment, the host controller 106 may use this information to determine the speed necessary for the external device plugged into the IIO port 104. In an embodiment, the host controller driver 105 may manage internal buffer configurations 101 of the physical memory cells 108 based on one or more of the speed, the link configuration, the lane configuration, bandwidth characteristics and/or the buffer characteristics of the external device 112, 122 when it is connected to apparatus 100. The host controller 106, along with the host controller driver 105, may be used to determine which physical memory cells 108 in the internal buffer 101 may be allocated to a particular external device 112, 122 connected via the IIO port 104. In an embodiment, the host controller 106, along with the host control driver 105, may be used to determine when there has been a change in the physical memory cells 108 which were used by a particular external device 112, 122 connected via the IIO port 104.

In an embodiment, the apparatus 100 may include one or more memories 108, 109. The memory 108, 109 may be any type of physical memory that can be powered on or off without impacting another device. The memory 108, 109 may include, but is not limited to, Static Random Access Memory (SRAM) or a Dynamic Random Access Memory (DRAM). Memory 108, 109 may be implemented using any machine-readable or computer-readable media capable of storing data, including both volatile and non-volatile memory. For example, memory 108, 109 may include random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information. The embodiments, however, are not limited in this context.

In an embodiment, memory 109 may be located inside the apparatus 100 but outside of the host controller 106. In an embodiment, memory 109 may include one or more physical memory cells. In an embodiment, one or more memory cells 108 may be located in one or more internal buffer arrays 101 inside the host controller 106. In an embodiment, the apparatus 100 may have one or more internal buffers 101 and each internal buffer 101 may include one or more physical memory cells 108. One or more internal buffers 101, together with the physical memory cells 108, may improve performance of the apparatus by holding information that is read from an external device 112, 122 so that it is available to the apparatus when needed.

In an embodiment, the apparatus 100 may include a power controller 111 connected to a power supply 103 such as an Advanced Technology Extended (ATX) power supply, a battery pack, and/or an alternating current (AC) power supply. In various implementations, the power controller 111 may be arranged to power down various aspects of the host controller 106, and the power supply 103 may be arranged to switch between AC and battery power. For example, the power controller 111 may be arranged to implement power saving measures and gate power to the memory cells 109 within the host controller 106 when the power supply 103 switches from AC power to battery power. In an embodiment, the power controller 111 may be implemented by one or more controllers (e.g., microcontroller), hardware board connections, or any combination thereof, as desired for a given set of design parameters or performance constraints.

In an embodiment, the apparatus 100 may comprise a power gating module 110. In an embodiment, the power gating module 110 may be coupled to the host controller 106. In an embodiment, the power gating module 110 may be located within the host controller 106. The power gating module 110 may be used to power gate signals to each memory cell 108 in the internal buffer 101. The power gating module 110 may be used to turn on and/or off the power of a cell in the memory array 108. The power gating module 110 may receive instructions from the host controller 106. In an embodiment, the power gating module 110 may selectively power off and/or power on subsets of memory cells 108 in internal buffer 101 in response to instructions received from host controller 106 or host controller driver 105. In an embodiment, the power gating module 110 may power off and/or power on one or more subsets of memory 109 within apparatus 100 that is operatively coupled to host controller 106 in response to instructions received from host controller 106 or host controller driver 105. In an embodiment, power gating can occur with respect to memory 109 when memory 109 includes one or more physical memory cells and operatively couples to the power gating module 110 and power controller 111. The power gating module 110 may function independently and/or may function with the power controller 111 to change the power levels of one or more memory cells 108, 109.

In an embodiment, the host controller 106 and the power gating module 110 may send control directives to the power controller 111 to modify power output from the power supply 103 to the one or more physical memory cells 108. The power controller 111 may increase and/or decrease the power level to the one or more physical memory cells 108.

External devices 112, 122 may be connected to the apparatus 100. In an embodiment, the external device 112, 122 may be plugged into one of the 110 ports 104 of the apparatus 100. The external device 112, 122 may supply additional data to the memory cells 108 of the apparatus 100. Examples of an external device 112, 122 may include, but are not limited to, a Universal Serial Bus (USB) device, a Peripheral Component Interconnect (PCI) device, a PCI Express device, a real time clock, a network interface card (NIC) device or any other device that is capable of inducing a change in state to a host controller 106. In an embodiment, one or more internal buffers 101 may be used to support each external physical device 112, 122. For example, a system with two external devices 112, 122 may use four buffers, with two buffers for each external device 112. In an embodiment, the host controller 106 may dynamically partition the physical memory cells 108 into one or more internal buffers 101 which may be allocated to the one or more external devices 112, 122 based on the external device characteristics. In an embodiment, physical memory cells 108 within an internal buffer 101 may be shared by external devices 112, 122. The embodiments, however, are not limited to these examples.

Figure 2:
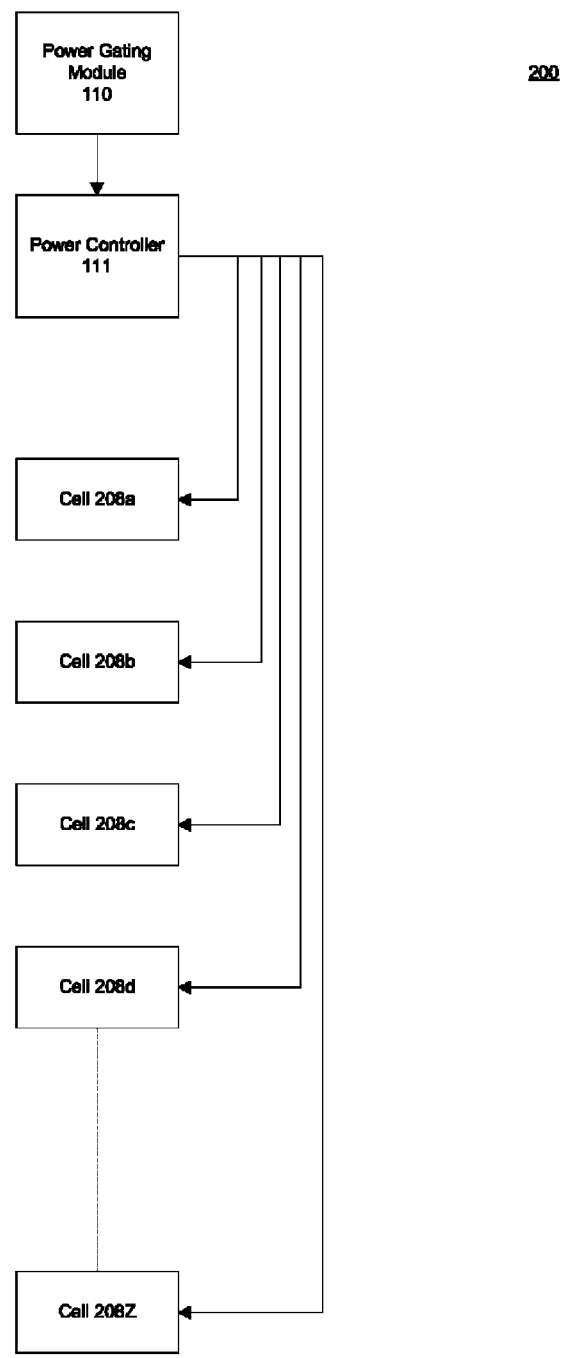
FIG. 2 illustrates an exemplary diagram of a physical memory array architecture according to an embodiment.

The operations of apparatus 100 may be further described with reference to FIG. 2 and accompanying examples. FIG. 2 illustrates an exemplary diagram of a physical memory array architecture according to an embodiment. In an embodiment, a buffer within a host controller may be portioned into subsets of physical memory cells. For example, the host controller may be a universal serial bus (USB) host controller and the one or more buffers may be portioned into a subset of static random access memory (SRAM) cells. In an embodiment, the apparatus 200 may include the power gating module 110 sending control directives to the power controller 111 to modify power output from the power to each of the physical memory cells 208a-Z. In an embodiment, the power gating module 110 may be coupled to the power controller 111. The power controller 111 may be coupled to the array of physical memories 208a-Z. The entire physical memory array may be partitioned into sub-blocks of memory cells, with each cell power gated by the power gating module 110 and the power controller 111. In an embodiment, the power controller 111 may be coupled to each physical memory cell 208a-Z. For example, the power controller 111 may be coupled to memory cell 208a, memory cell 208b, memory cell 208c, etc. all the way to, and including, memory cell 208Z. Each memory cell may include a unique address and data. In an embodiment, the apparatus 200 may include 16 memory cells. In an embodiment, the apparatus 200 may include 8 memory cells. The embodiments, however, are not limited to these examples.

In an embodiment, the power gating module 110 and the power controller 111 may be controlled by the host controller driver (as shown in FIG. 1) to remove or to restore power to individual physical memory cells 208a-Z. In an embodiment, the physical memory cells 208a-Z may be dynamically powered on and/or off based on the types of devices plugged into the apparatus and the one or more negotiated external device characteristics. In an embodiment, at system power-up, all physical memory cells 208a-Z may be placed in a power down state to conserve power. In an embodiment, when an external device is plugged into the IIO, a host controller may detect a speed of the external device and may activate and/or restore power to a subset of physical memory cells 208a-Z for use with the external device. In an embodiment, the sub-block of memory cells may be powered up and arranged into queue structures upon detection of an external device being connected to the host controller. In an embodiment, a subset of physical memory cells 208a-Z used by an external device may be powered off upon detection of the external device being removed from the host controller.

Figure 3:
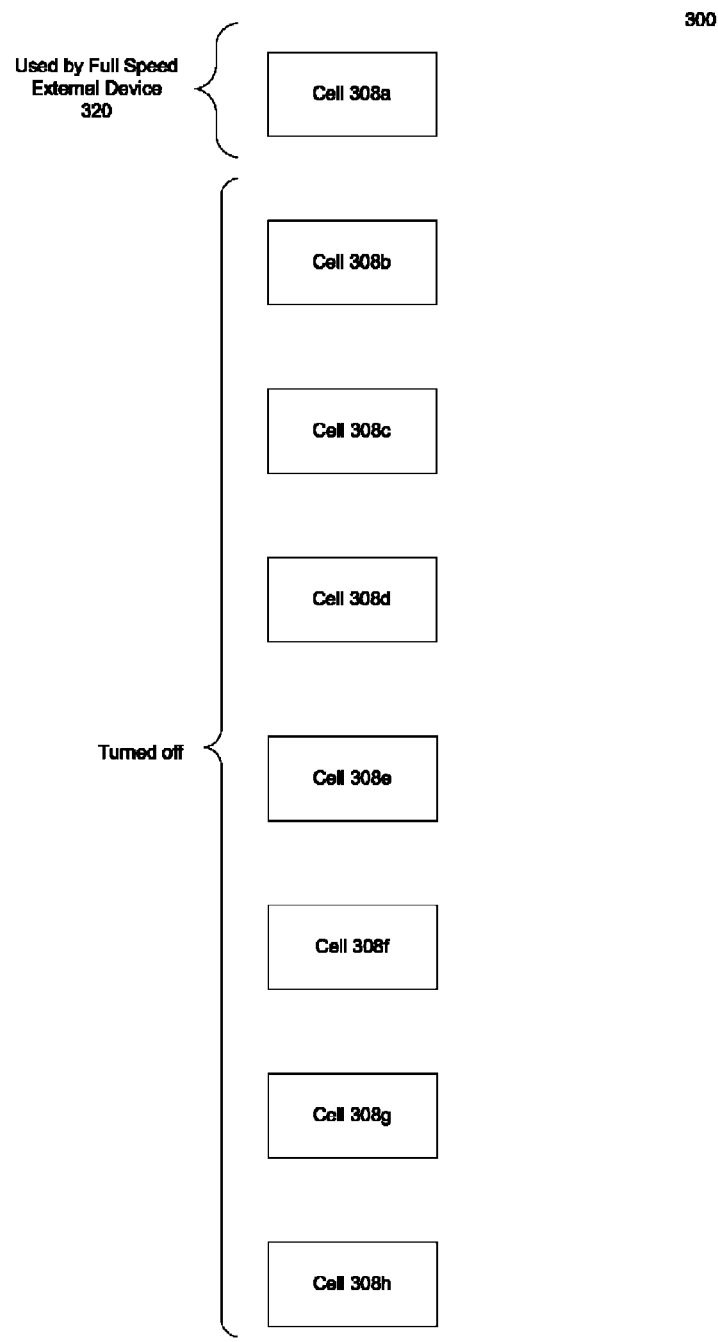
FIG. 3 illustrates an exemplary diagram for a full speed external device using the buffer array according to an embodiment.

FIG. 3 illustrates an exemplary diagram for a full speed external device using the buffer array according to an embodiment. FIG. 3 discloses an exemplary state of the host controller's memory array utilization when an external full speed USB device is detected. As shown in FIG. 3, memory cell 308a may be used by an external USB device with a full speed configuration 320. In an embodiment, memory cell 308a may be turned on via the power controller and the power gating module (as shown in FIG. 2). In an embodiment, the remaining memory cells 308b-h in apparatus 300 may be turned off.

In an embodiment, the host controller may determine that only one memory cell may be needed to support the operative speed of the external device. In an embodiment, the host controller may be programmed to determine how many cells are necessary for an external device. In an embodiment, the number of physical memory cells which are activated may depend on one or more external device characteristics. External device characteristics may include one or more of the speed, bandwidth characteristic, buffer characteristic and/or lane configuration of the external device. In an embodiment, the host controller may detect one or more of the speed, bandwidth characteristic and or lane configuration to determine the number of memory cells to be allocated to the external device. For example, an external device may be plugged into a PCI Express port and the host controller may detect a hot plug event and arrange the buffer to a specific size based on the speed, bandwidth characteristic and lane configuration of the detected external device. In an embodiment, the number of cells used by or allocated to an external device may be determined based on one or more negotiated external device characteristics between a host controller and the external device. In an embodiment, the number of cells used by or allocated to an external device may be dynamically changed in response to an event related to the external device. For example, subsets of previously allocated cells may be powered off if it is detected that the external device has entered a low power state and the device can function with fewer cells.

In an embodiment, the speed of an external USB device may be low speed, full speed, high speed or bandwidth critical. In an embodiment, an external device with a full speed configuration may be determined by the controller driver. In an embodiment, for a full speed external device, the host controller may power on a single memory cell. In an embodiment, two memory cells may be powered on for a full speed external device. In an embodiment, the controller driver may determine that the external device has a high speed. In an embodiment, a host controller may power on four memory cells to support a high speed external device. A high speed external device may have a large queue structure and a higher transmission and reception speed than a full speed external device. In an embodiment, the host controller may power on three memory cells for a high speed external device. In an embodiment, there may be a maximum number of cells that may be allocated to a particular external device. For example, an external drive may only be allocated four memory cells within the apparatus. While FIGS. 3-5 refer to USB devices with various speeds (i.e., low, full or high speed), the embodiments, however, are not limited to these examples. For example, a PCI external device may use various amounts of memory cells based on various speed and/or buffer characteristics.

In an embodiment, an address register may be used to keep track of the active and non-active memory cells. In an embodiment, based on the number of external devices supported by the host controller, the host controller may maintain a set of registers to keep track of address pointers to the physical memory array. The pointers may be used for keeping track of locations for reading and writing data and implementing suitable queue structures using subsets of the physical memory array. In an embodiment, address pointers, such as, but not limited to, start, end and a current address of the queues may be updated by the controller driver according to the number of active memory cells. In an embodiment, an address register may be used to keep track of queue structures of each individual external device's use of the memory cells. In an embodiment, an address register may be used to access the power gating module by a host controller driver.

Figure 4:
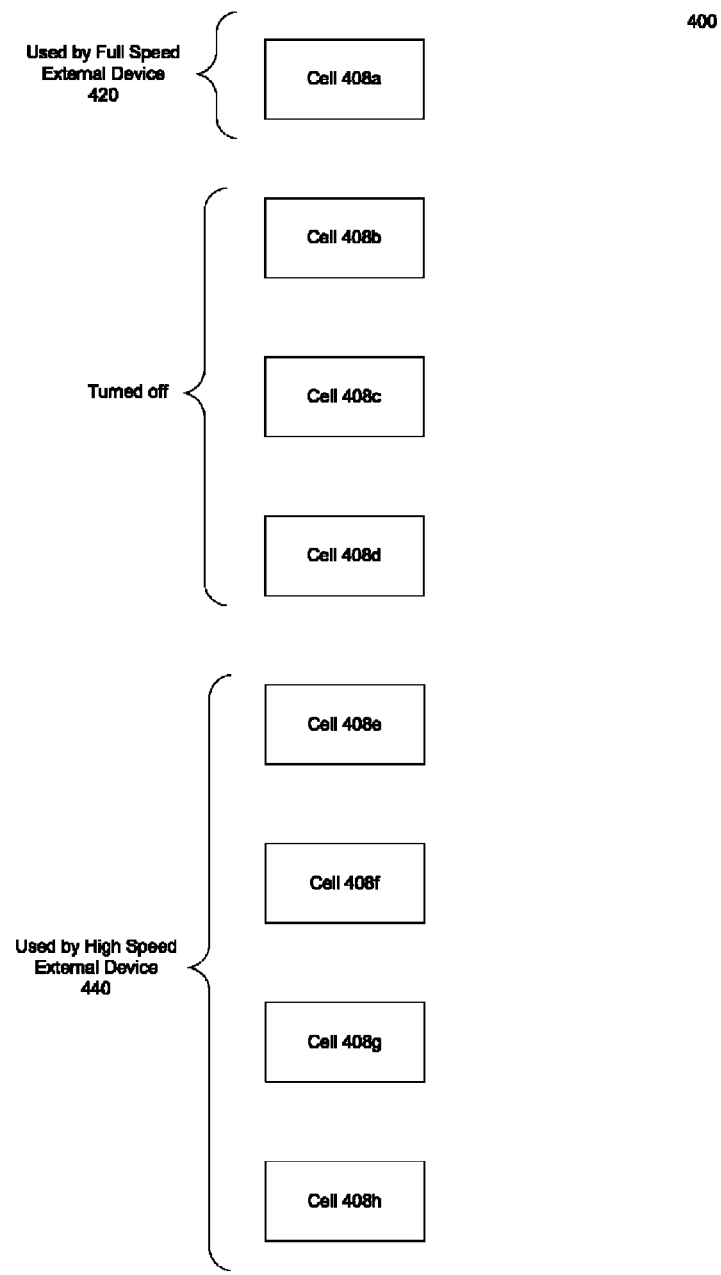
FIG. 4 discloses an exemplary diagram for a full speed external device and a high speed external device using the buffer array according to an embodiment.

FIG. 4 discloses an exemplary diagram for a full speed external device and a high speed external device using the buffer array according to an embodiment. FIG. 4 discloses an exemplary state of the controller's memory array utilization when a first external device with a full speed 420 and a second external device with a high speed 440 are detected by the apparatus. As shown in FIG. 4, a subset of the memory cells may remain powered off when they are not needed. For example, memory cell 408a may be powered on and used by the full speed external device 420. Additionally, memory cells 410e, 410f, 410g and 410h may be dynamically powered on and activated for use by the high speed external device. In an embodiment, each external device may be allocated a maximum number of cells. In FIG. 4, each external device may be allocated four cells. The first external device 420 may not require all four cells and may only need a single cell to be powered on. The second external device 440 may require four cells and may be allocated the fifth through the eighth cells (cells 408e-h). Memory cells two, three and four may remain allocated to the first external device even though they are powered off. By allocating cells one through four to the first external device, the apparatus ensures that if the first external device 420 is removed and a third high speed external device is added to replace full speed device 420, there may be four continuous cells to allocate to the third external device.

In an embodiment, memory cells may be dynamically activated when and for as long as they are needed. In an embodiment, when the host controller detects that an external device is no longer in use, the host controller may reclaim the unused memory cells by powering off those cells used by the now inactive external device. For example, memory cells may be powered off when the external device is unplugged and/or enters an idle, low power and/or sleep state.

Figure 5:
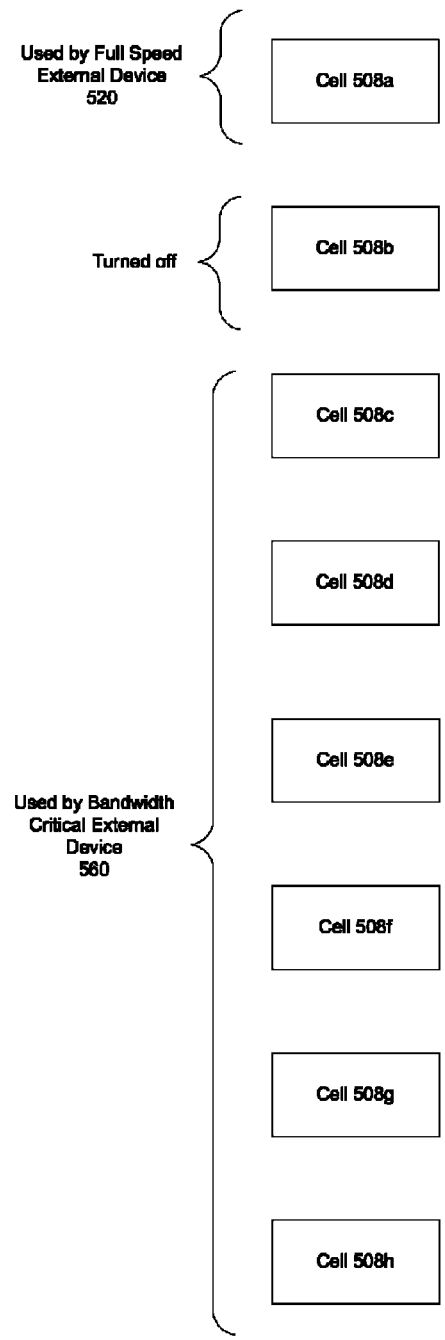
FIG. 5 illustrates an exemplary diagram for a full speed external device and a bandwidth critical external device using the buffer array of an exemplary system according to an embodiment.

FIG. 5 illustrates an exemplary diagram for a full speed external device and a bandwidth critical external device using the buffer array of an exemplary system according to an embodiment. In an embodiment, one or more memory cells allocated to one device may be used by a second device if the second device needs an extra large buffer for quality of service critical applications. Quality of service critical allocations may include but are not limited to a universal serial bus (USB) to digital visual interface (DVI) display application. In an embodiment, the number of additional cells used may be determined based on one or more negotiated external device characteristics between a host controller and the external device. For example, the external device may support larger burst reads and/or writes with a larger buffer. Referring to FIG. 5, the full speed external device 520 may only require a single cell be powered on. A bandwidth critical external device 560 may require more bandwidth than the four allocated cells. Since the full speed external device 520 only uses a single cell, there may be three cells 508b, 508c and 508d which are currently powered off as they are not needed by the full speed external device. If the bandwidth critical device requires a total of six cells (i.e. two additional cells), the host controller may allocate two cells, 508c and 508d, to the bandwidth critical external device 560. As a result of the buffer sharing, 508a may be powered up and used by the full speed external device, memory cell 508b may be powered off and memory cells 508c through 508h may be powered up and used by the bandwidth critical external device 560.

Figure 6:
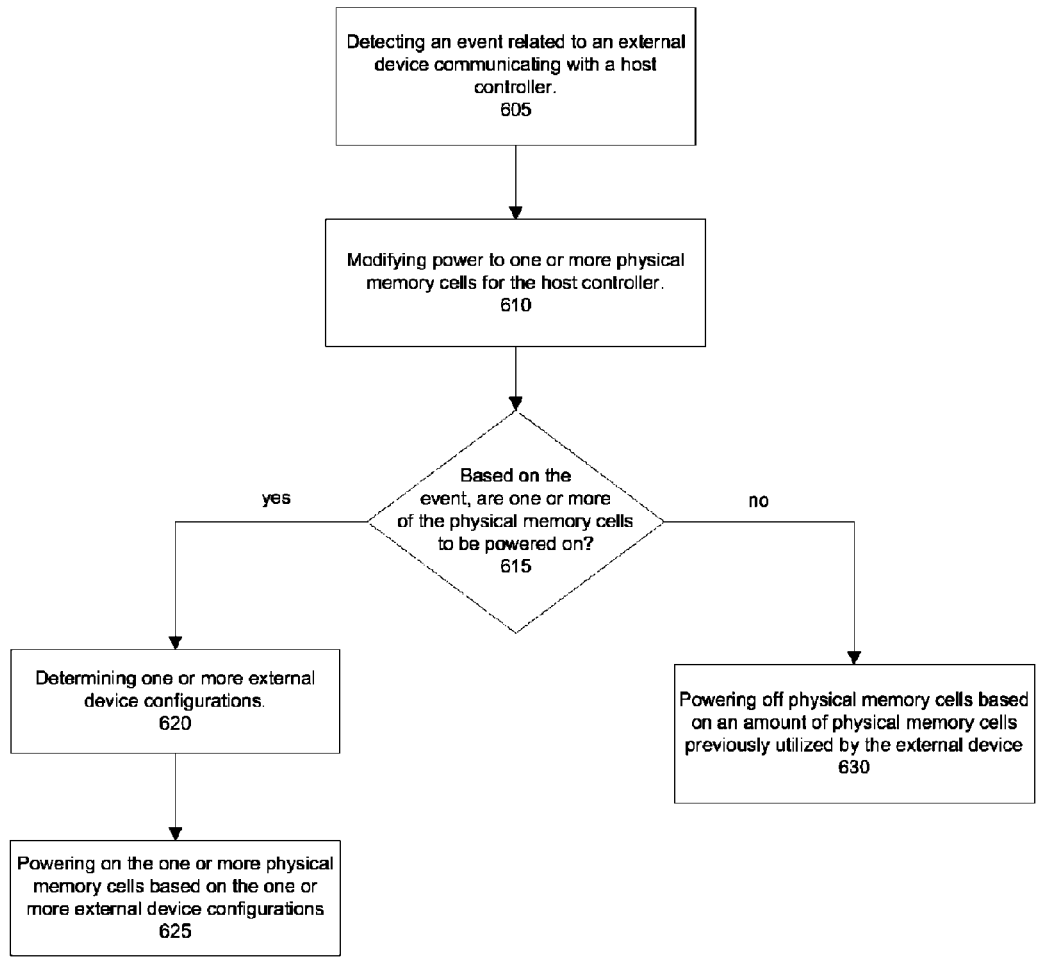
FIG. 6 illustrates an exemplary logic flow according to an embodiment.

Although FIG. 6 as presented herein may include a particular programming logic, it can be appreciated that the programming logic merely provides an example of how the general functionality described herein can be implemented. Further, the given programming logic does not necessarily have to be executed in the order presented unless otherwise indicated.

FIG. 6 illustrates an exemplary logic flow according to an embodiment. FIG. 6 depicts a programming logic 600 for reducing the power consumption state of processors according to an embodiment. The logic flow 600 may be representative of the operations executed by one or more embodiments described herein. As shown in the logic flow 600, an event related to an external device may be detected at block 605. In an embodiment, an event related to an external device communicating with host controller may be detected. An external device may include a universal serial bus, a peripheral component interconnect, a quick path interconnect, or any other devices. In an embodiment, an event may occur when the external device is plugged into the hosting device. In an embodiment, an event may occur when the external device is unplugged from the hosting device. In an embodiment, an event may occur when the external device is unplugged and/or in an idle, low power and/or a sleep state.

In an embodiment, power to one or more physical memory cells of the host controller may be modified at block 610. In an embodiment, the physical memory cells may be part of one or more internal buffers. In an embodiment, size of one or more internal buffers may be arranged. It may be determined whether one or more of the physical memory cells are to be powered on based on the event at diamond 615. In an embodiment, a host controller may determine whether to power on or off one or more of the physical memory cells. If one or more of the physical memory cells are powered on, one or more external device characteristics may be determined at block 620. External device characteristics may include a device speed, a lane configuration, a bandwidth characteristic and/or a buffer characteristic for the external device.

In an embodiment, one or more physical memory cells may be powered on based on the one or more external device characteristics at block 625. In an embodiment, a second event related to a second external device communicating with the host controller may be detected. One or more external device characteristics of the second external device may be determined. Power to one or more physical memory cells may be modified based on the one or more external device characteristics of the second external device.

In an embodiment it may be determined whether a host controller buffer has available non-allocated physical memory cells based on a first external device. One or more of the non-allocated physical memory cells may be allocated to the second external device based on the one or more external device characteristics of the second external device.

In an embodiment, if based on the event, one or more of the physical memory cells not powered on, then one or more of the physical memory cells may be powered off. For example, the one or more physical memory cells may be powered off when the memory cells are no longer needed by external device based on the one or more external device characteristics. The one or more physical memory cells may be powered off based on an amount of memory cell previously utilized by the external device at block 630.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that modifies, manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. sctn. 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a machine-readable storage medium containing instructions that when executed enable a system to:
   detect an event related to two or more external devices communicating with a host controller;
   determine one or more external device characteristics of the two or more external devices;
   determine whether a host controller buffer has available non-allocated physical memory cells based on a first of the two or more external devices;
   allocate non-allocated physical memory cells to a second of the two or more external devices based on the device characteristics of the second external device; and
   modify power to one or more physical memory cells for the host controller based on the one or more external device characteristics of the two or more external devices, the host controller to dynamically partition the one or more physical memory cells into one or more internal buffers to be allocated to the two or more external devices based on the one or more external device characteristics.

2. The article of claim 1 comprising instructions that when executed enable a system to power off one or more of the physical memory cells.

3. The article of claim 1 comprising instructions that when executed enable a system to arrange a size of one or more of the one or more internal buffers.

4. The article of claim 1 comprising instructions that when executed enable a system to detect that the one or more external devices are one of plugged or unplugged from a device comprising the host controller.

5. The article of claim 1 comprising instructions that when executed enable a system to detect one or more of an idle, low power or a sleep state of the one or more external devices.

6. The article of claim 1 comprising instructions that when executed enable a system to:
   determine the one or more external device characteristics of the one or more external devices; and
   power on at least one of the one or more physical memory cells based on the one or more external device characteristics.

7. The article of claim 6 comprising instructions that when executed enable a system to determine one or more of a device speed, a lane configuration, a bandwidth characteristic and a buffer characteristic for one or more of the one or more external devices.

8. An apparatus, comprising:
   a host controller to detect an event related to two or more external devices, to determine one or more external device characteristics of the two or more external devices, to determine whether a host controller buffer has available non-allocated physical memory cells based on a first of the two or more external devices, and to allocate non-allocated physical memory cells to a second of the two or more external devices based on the device characteristics of the second external device; and
   one or more physical memory cells arranged as part of the host controller, the host controller to modify power to the one or more physical memory cells based on the one or more external device characteristics of the two or more external devices and to dynamically partition the one or more physical memory cells into one or more internal buffers to be allocated to the two or more external devices based the on one or more external device characteristics in response to detection of the event.

9. The apparatus of claim 8, the host controller operative to determine the one or more external device characteristics of the one or more external devices, the one or more external device characteristics comprising one or more of a device speed, a lane configuration, a bandwidth characteristic and a buffer characteristic.

10. The apparatus of claim 8, comprising: an external device of the one or more external devices to communicatively couple to the host controller, the external device comprising one or more of a universal serial bus device, a peripheral component interconnect device, a peripheral component interconnect express device or a quick path interconnect device.

11. The apparatus of claim 8, the one or more physical memory cells comprising at least part of an internal buffer.

12. A method comprising:
   detecting an event related to two or more external devices communicating with a host controller;
   determining one or more external device characteristics of the two or more external devices;
   determining whether a host controller buffer has available non-allocated physical memory cells based on a first of the two or more external devices;
   allocating non-allocated physical memory cells to a second of the two or more external devices based on the device characteristics of the second external device; and
   modifying power to one or more physical memory cells for the host controller based on the one or more external device characteristics, the modifying comprising dynamically partitioning the one or more physical memory cells into one or more internal buffers to be allocated to the two or more external devices based on the one or more external device characteristics.

13. The method of claim 12, comprising: detecting that one or more of the one or more external devices is plugged into a device comprising the host controller.

14. The method of claim 12, comprising: detecting that one or more of the one or more external devices is unplugged from a device comprising the host controller.

15. The method of claim 12, comprising: detecting one or more of an idle, low power or a sleep state of one or more of the one or more external devices.

16. The method of claim 12, comprising:
   detecting an event related to two or more external devices communicating with the host controller;
   determining one or more external device characteristics of the two or more external devices; and
   modifying the one or more physical memory cells based on the one or more external device characteristics.

17. The method of claim 12, comprising: determining the one or more external device characteristics based on one or more of a device speed, a lane configuration, a bandwidth characteristic and a buffer characteristics for the one or more external devices.

* * * * *

UNITED STATES PATENT AND TRADEMARK OFFICE
CERTIFICATE OF CORRECTION

PATENT NO. : 8,631,255 B2  Page 1 of 1
APPLICATION NO. : 12/910338
DATED : January 14, 2014
INVENTOR(S) : Yen Hsiang Chew It is certified that error appears in the above-identified patent and that said Letters Patent is hereby corrected as shown below:

In the Claims

In column 12, line 10, In Claim 8, delete "the on" and insert -- on the --, therefor.

Signed and Sealed this
Second Day of September, 2014

Michelle K. Lee
*Deputy Director of the United States Patent and Trademark Office*